United States Patent [19]

Tai et al.

[11] Patent Number: 4,497,927

[45] Date of Patent: Feb. 5, 1985

[54] TIRE TREAD ADHESIVES

[75] Inventors: Wun T. Tai, Palos Hills; Kenneth G. Phillips, River Forest, both of Ill.

[73] Assignee: Nalco Chemical Company, Oak Brook, Ill.

[21] Appl. No.: 621,297

[22] Filed: Jun. 15, 1984

Related U.S. Application Data

[63] Continuation-in-part of Ser. No. 415,496, Sep. 7, 1982.

[51] Int. Cl.$^3$ ............................................. C08K 5/01
[52] U.S. Cl. ..................................... 524/475; 524/801
[58] Field of Search ................................ 524/475, 801

[56] References Cited

U.S. PATENT DOCUMENTS 3,533,982  10/1970  Schmidt et al. ..................... 523/337

Primary Examiner—Joseph L. Schofer
Assistant Examiner—N. Sarofim
Attorney, Agent, or Firm—John G. Premo; Robert A. Miller; Donald G. Epple

[57] ABSTRACT

A tire tread adhesive or cement having superior green tack, excellent cured adhesion, and rapid drying time is disclosed. The tread cement comprises a water-in-oil emulsion having an oil continuous phase in which is dissolved a vulcanizable rubber compound. The water-in-oil emulsion tread adhesive may contain from 20–80% water, thereby minimizing environmental contamination on drying.

12 Claims, No Drawings

TIRE TREAD ADHESIVES

This is a continuation-in-part of patent application Ser. No. 415,496, filed Sept. 7, 1982, which is still pending before the U.S. Patent & Trademark Office.

This invention relates to the development of an adhesive having a very low level of volatile hydrocarbon. It has particular utility for bonding a tire tread to the carcass or casing.

The key requirements for tread adhesive in the tire industry are: good green tack, good cured adhesion and fast drying time. Tread adhesives, also referred to as tread cements in the industry, are employed in the tire-building stage to bind green tread to green tire carcass or, in case of retread tires, to tire casing. There are two types of tread adhesives, namely tread bottom (or "undertread") and tread end (or "splice") adhesives.

These adhesives are applied to the tread while the tread stocks are being made, as follows: as a strip of tread is being extruded (at a temperature between 200°-250° F.) the tread bottom adhesive is continuously applied to the bottom part of the hot tread, generally by a roller or a brush. After the adhesive solvents evaporate, the tread is passed through water tanks for cooling. Afterwards, the tread is dried, skived (meaning cut on an angle into small pieces), coated with a tread end adhesive, and stored in a tread tray. The time required for the tread to travel from the exit end of the extruder to the water tanks is called scorch time, usually less than a minute. Therefore, any adhesive should dry sufficiently within this scorch time to the extent that the adhesive will not wash off the extruded tread in the cooling tanks.

Commercial tread adhesives employ a large amount of volatile hydrocarbon as solvent. Because of environmental regulations, volatile hydrocarbon solvents are deemed undesirable except in limited quantity.

Reductions of hydrocarbon emission from the adhesives could be achieved if the hydrocarbon solvent is partially replaced or diluted with water. Consequently a water-base adhesive could be an approach in developing adhesives with low levels of hydrocarbon emission and the achievement of this is also one of the primary objects of the invention.

THE INVENTION

We have discovered a tire tread adhesive or cement having superior green tack, excellent cured adhesion and a rapid drying time and which also contains low volatile solvent content. The tire tread cement comprises a water-in-oil emulsion having an oil continuous phase containing:

| Ingredients | Weight % |
| --- | --- |
| (a) Vulcanizable rubber compound | 0.5–15.0 |
| (b) Organic hydrocarbon liquid solvent having a B.P. greater than 230° F. | 1.0–50.0 |
| (c) Water | 20.0–80.0 |
| (d) Surfactant having an HLB between about 3.6–18 | 0.1–10.0 |
| (e) Tackifier | 0.0–10.0 |
| (f) Plasticizer | 0.0–10.0 | and wherein the continuous oil phase of the water-in-oil emulsion comprises an organic solvent solution of the vulcanizable rubber compound.

When higher amounts of volatile organic solvent can be tolerated, it is preferred to combine the organic hydrocarbon liquid solvent having a boiling point (B.P.) greater than 230° F. with a different organic hydrocarbon extract solvent having a lower boiling point below 111° C. When this combination of organic hydrocarbon liquid solvents can be tolerated, it is preferred that the ratio of organic hydrocarbon liquid solvent having a boiling point greater than 230° F. to the different organic liquid hydrocarbon having a boiling point below 111° C. be in the range of 5:1 to about 1:5.

The preferred tire tread cement comprises a water-in-oil emulsion containing:

| Ingredients | Weight % |
| --- | --- |
| (a) Vulcanizable rubber compound | 1.0–10.0 |
| (b) Organic hydrocarbon liquid solvent having a B.P. greater than 230° F. | 5.0–40.0 |
| (c) Water | 40.0–80.0 |
| (d) Surfactant having an HLB between about 8–18 | 0.25–5.0 |
| (e) Tackifier | 1.0–5.0 |
| (f) Plasticizer | 1.0–5.0 | and wherein the continuous oil phase of the water-in-oil emulsion comprises an organic hydrocarbon liquid solvent solution of the vulcanizable rubber compound.

Again, if conditions allow, it is preferred to admix with the organic hydrocarbon liquid solvent having a boiling point (B.P.) greater than 230° F., another and different organic hydrocarbon liquid having a lower boiling point below 111° C. Such an admixture would be present within the preferred range of 5–40.0 weight percent and be in the ratio of high boiling organic liquid solvent to low boiling organic liquid solvent between about 5:1 to 1:5. All boiling points are to be considered measured at standard atmospheric pressure.

THE VULCANIZABLE RUBBER COMPOUND

The vulcanizable rubber compound includes an unvulcanized natural or synthetic rubber (e.g., Buna, SBR, etc.) combined with a cross-linking system and other compounding ingredients. Preferred is a tread stock rubber compound, since there can be no question that it will be compatible with the tread rubber of the tire. There are many equivalents. The amount present in the emulsion will vary between 0.5 to 15 and, preferably, 1 to 10% by weight.

THE ORGANIC HYDROCARBON LIQUID SOLVENTS

The invention utilizes as the organic solvent an organic hydrocarbon liquid solvent which has a boiling point at least 10° F. greater than the boiling point of water, or greater than 230° F. Such solvents may be selected from a wide variety of materials. One preferred material may be designated as a low odor paraffin solvent, or LOPS. This solvent has the following characteristics:

| Specific Gravity 60° F. | 0.780–0.806 |
| --- | --- |
| Color, Saybolt | +30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |

| Sulfur, ppm, Microcoulometer | 15 max. |
| --- | --- |

In addition to using these paraffin-type solvents which are preferred, it is understood that other solvents such as high boiling kerosenes, napthas, lubricating stocks, mineral spirits, and the like may be used.

While these high-boiling solvents may be used alone with the vulcanizable rubber compound to provide the oil phase of the water-in-oil emulsion, such an emulsion cement requires that the tire tread stock so treated be subjected to extensive drying times. If no additional procedures exist to handle volatile organic vapors, this is most desirable. However, to speed up the drying time, it is a preferred embodiment of the invention to use as the total amount of organic solvent, a combination of the high boiling solvents of the type described above and a different low boiling solvent having a boiling point below about 111° C.

These low-boiling solvents are organic liquids, preferably hydrocarbon organic liquids, which have a boiling point below 111° C. Typical of such solvents are gasoline, hexane, heptane, toluene and the like. When these low-boiling organic solvents are combined with the high boiling organic solvents, it is preferred to do so to provide a ratio of high boiling solvent to low boiling solvent within the range of 5:1 to 1:5. The particular ratio embodied will be governed by the ingredients of the finished emulsion, the rubber stock being treated, and the drying environment to which the emulsion would be subjected.

When a considerably higher level of solvent emissions can be tolerated due to improved ability to remove such emissions from environmental exhaust gases, solvents used to make up the oil phase of water-in-oil emulsions can consist entirely of low-boiling organic liquids such as those enumerated above.

RATIO OF ORGANIC SOLVENT TO WATER

To make satisfactory emulsion, it is desirable that the ratio of organic solvent to water be within the range of 1:5 to 4:1. In most instances, good products are afforded when the ratio is 1:1 to 1:3.5. Again, the ratios must be adjusted to suit the use to which the particular products are employed.

In the emulsion, the organic solvent, whether a single solvent or mixed solvents, is present by weight in amounts ranging from 1–50 and, preferably 5–40% by weight.

THE SURFACTANT-WATER-IN-OIL EMULSIFIER

One of the surprising features of the invention is that the emulsions used in the invention are rendered stable by utilizing a surfactant which has an HLB within the range of 8–18 and preferably 8–14.

Emulsifiers may be classified by using the Atlas HLB System. This system is described in the publication entitled, *The Atlas HLB System,* 4th Printing, Atlas Chemical Industries, Inc., Wilmington, Del. 1963. This publication and its entire contents are incorporated herein by reference and made a part of this specification. Generally, oil-soluble emulsifiers produce water-in-oil emulsions, whereas water-soluble emulsifiers produce oil-in-water emulsions.

Also, as a general rule, the HLB number of the oil-soluble emulsifier will range between 4–9, whereas the HLB number of the water-soluble surfactant or emulsifier will have a value of approximately 8–40. In certain cases, a single surfactant may be capable of producing either a water-in-oil or oil-in-water emulsion.

Surfactants within the HLB range of 8–18 are normally considered as oil-in-water emulsifiers, yet they act as water-in-oil emulsifiers for the emulsions used in the practice of this invention. A preferred surfactant is the material known as Polytergent B-150, which is a nonylphenoxy polyethoxyethanol having an HLB of 8.8. It is further characterized as dispersible, but not soluble in water. Another useful material is Triton X-114, which is octylphenol reacted with about nine moles of ethylene oxide. It has an HLB of 12.5.

Other water-dispersible or -soluble surfactants falling within the above parameters may be used.

While surfactants of the above type are preferred, it is understood that low HLB surfactants may be used to stabilize the emulsions.

The amount of surfactants used to produce the water-in-oil emulsions of the invention may be varied between as little as 0.05 up to 10% by weight with a preferred range being 0.1–5% by weight. The exact amount is, of course, dependent upon the emulsifier used in the ingredients of the emulsion and the like.

ADDITIONAL INGREDIENTS

A. Tackifiers

It is common to employ in the formulas of the invention tackifiers which aid in developing the tackiness of the vulcanizable rubber compound. Materials of this type are well-known to the art. A typical material of this type is sold under the trademark AKROCHEM P-90. This material is an alkylphenol formaldehyde resin. The tackifiers may be used in the formulation in amounts ranging between 0–10% by weight with a preferred range being 1–5% by weight. Another method of calculating tackifier dosage is to use an amount ranging between the weight ratios of 0:1 to 8:1 based on the vulcanizable rubbercompound. From these ratios, it is apparent the tackifier is an optional ingredient. However, preferably the tire tread cements of this invention contain between 1.0 to 5.0 weight percent tackifier.

B. Plasticizers

A plasticizer for the rubber compound is used to enhance the cured adhesion and since the plasticizer's boiling point is usually extremely high, it remains effective for weeks without appreciable loss due to evaporation. When the water-in-oil tire tread cement is coated on a hot green tread, the tackifier content increases the green tack of this tire tread cement and should also serve the role of a nonvolatile solvent. The preferred plasticizer, Santicizer 97, is an heptyl nonyl adipate ester. The plasticizer is normally an optional ingredient, being present in the tire tread cement formulations in ranges between about 0–10.0 weight %, preferably between about 1.0–5.0 weight percent. However, the amount of plasticizer when Santicizer is used may vary between 1–10% by weight.

BREAKING THE EMULSIONS

Another surprising feature of the invention is that the emulsions break under conditions of use. Specifically, they break when they come in contact with uncured rubber, either natural or synthetic. This emulsion breaking phenomenon deposits the adhesive on the surface treated with the emulsion cement. Subsequent drying removes the excess water and low boiling organic solvent, if such is present. The high boiling organic solvent is absorbed into the rubber, thereby increasing its tackiness. This improves the adhesive characteristics of the total assemblage treated with the adhesive.

GENERAL FORMULA

To illustrate the invention more specifically, a general formula is set forth below:

| General Formula | |
|---|---|
| Ingredients | % by Weight |
| Rubber Compound | |
| General | 0.5–15 |
| Preferred | 1.0–10 |
| The Organic Solvent | |
| General | 1.0–50 |
| Preferred | 5.0–40 |
| Water | |
| General | 20.0–80 |
| Preferred | 40.0–80 |
| The Surfactant | |
| General | 0.1–10 |
| Preferred | 0.25–5 |
| Tackifier | |
| General | 0.0–10 |
| Preferred | 1.0–5 |
| Plasticizer | |
| General | 0.0–10 |
| Preferred | 1.0–5 |

To further illustrate the invention, the following are presented by way of examples.

EXAMPLES

Example 1

With the foregoing in mind, the following formulation (water-in-oil emulsion adhesive) was developed having a low order of hydrocarbon content (hydrocarbon content reduced by 88.3%) and when tested against an industry standard (hydrocarbon based solvent), the emulsion adhesive equaled the standard on the basis of cured adhesion but was deemed somewhat inferior in green tack strength. Nonetheless, this adhesive did demonstrate the feasibility of preparing a tread adhesive with a low level of hydrocarbon.

| Composition 1 | |
|---|---|
| | Wt. % |
| Rubber Compound | 8.69 |
| (Natural rubber-based tread stock) | |
| Heptane | 10.86 |
| Tackifier (1) | 3.80 |
| LOPS | 40.82 |
| Plasticizer (2) | 5.30 |
| Surfactant | 1.19 |
| H₂O | 29.34 |
| | 100.00 |

(1) Akrochem P-90: alkyl phenol formaldehyde condensation product
(2) Santisizer 97

The rubber compound is a natural rubber tread stock. This is also true of the rubber compound in the examples following. A preferred rubber compound is one having a Mooney (ML) Viscosity of 32 to 54; Shore "A" hardness 55/69; 100% modulus, 250/350; 200% modulus, 600/1100; tensile, 310/500.

This emulsion has a Brookfield viscosity of 3200 (#3 spindle, 12 RPM). A 2 mil coating of this adhesive applied to a hot green tread (heated with hot air at 200°–200° F. for 40 seconds) will dry in about one minute. The emulsion adhesive, however, was found to be unstable to further addition of water in an effort to reduce its solids content. To overcome this deficiency, a second formulation was tried (Example 2) having a water content of 41.5% and 9.5% solids. It was found this adhesive could be further diluted with water to contain only 3.8% solids, 77% water, without encountering emulsion instability.

Example 2

Another composition was prepared and tested. Its formula is set forth below as Composition 2:

| Composition 2 | |
|---|---|
| | Wt. % |
| Isoprene-SBR-Based Rubber Compound | 2 |
| Tackifier (above) | 6 |
| Heptane | 10 |
| LOPS | 30 |
| Plasticizer (above) | 10 |
| Surfactant (above) | 0.5 |
| H₂O | 41.5 |
| | 100.0 |

Attributes and features of this example on further dilution are set forth in Table 1:

TABLE I

| | Comp. 2 % | Comp. 2 H₂O (1:1) % | Comp. 2 H₂O (2:3) % | Comp. 2 H₂O (6.5:3.5) % | Standard Cement % |
|---|---|---|---|---|---|
| Rubber Compound | 2 | 1 | 0.8 | 0.7 | Rubber |
| Tackifier | 6 | 3 | 2.4 | 2.1 | compounds |
| Heptane | 10 | 5 | 4.0 | 3.5 | dissolved |
| LOPS | 30 | 15 | 12.0 | 10.5 | in gasoline |
| Santicizer 97 | 10 | 5 | 4.0 | 3.5 | |
| Polytergent B-150 | 0.5 | 0.25 | 0.2 | 0.17 | |
| H₂O | 41.5 | 70.75 | 76.6 | 79.53 | |
| | 100.0 | 100.00 | 100.0 | 100.00 | |
| Emulsion stability 1 week standing | no separation | no separation | no separation | no separation | no separation |
| Green Tack (psi), 2 mil | | | | | |
| Fresh | 7.4 | 5.0 | 6.4 | 6.0 | 4.0 |
| 5 days | 6.2 | 3.8 | 3.1 | 2.1 | 3.9 |

TABLE I-continued

|  | Comp. 2 % | Comp. 2 H$_2$O (1:1) % | Comp. 2 H$_2$O (2:3) % | Comp. 2 H$_2$O (6.5:3.5) % | Standard Cement % |
|---|---|---|---|---|---|
| Cured Adhesion, 2 mil | | | | | |
| Tensile (psi) cold$^{(1)}$/hot$^{(2)}$ | 175/63.6 | 203/75.0 | 210/06.7 | 107/72.5 | 173/75.0 |
| % Cohesive Failure cold/hot | ~100/~100 | ~100/~100 | ~100/~100 | ~100/~100 | ~100/~100 |
| Bks cps 24° C., 12, 30 RPM | 45.6 | 290 | 210 | 200 | 25.0 |
| % Hydrocarbon emission on rubber | 28.8 | 13.0 | 10.0 | — | 89.2 |
| % Emission Reduction | 67.7 | 85.4 | 88.8 | — | — |
| Drying Time at 200–220° F., 2 mil | Less than 40 sec. | Less than 40 sec. | Less than 40 sec. | — | 5 sec. |

$^{(1)}$Tested at Ambient temperature
$^{(2)}$Tested at 250° F.

Example 3

Another composition was prepared. This one utilized a harder rubber compound:

| Composition 3 | Wt. % |
|---|---|
| Polyisoprene Rubber Compound | 1 |
| Akrochem P-90 | 3 |
| LOPS | 15 |
| Santicizer 97 | 5 |
| Polytergent B-150 | 0.25 |
| Heptane | 5 |
| H$_2$O | 70.75 |
|  | 100.00 |
| Physical Properties | |
| Brookfield viscosity: 650 (#2 spindle, 30 rpm, 25° C.) | |
| Flash point (°F.) - 64 | |

Laboratory tests showed that the performance properties of Composition 3, including cured adhesion and green tack, were comparable to those of Composition 2 diluted with an equal weight of water.

Example 4

In this Example, a soft rubber compound was chosen for use in a preferred composition as described below. Compositions 3 and 4 were compared against each other in field tests conducted at different tire companies:

| Composition 4 | Wt. % |
|---|---|
| Natural rubber-based Rubber Compound (Mooney ML 32) | 1 |
| LOPS | 14 |
| Akrochem P-90 | 4 |
| Santicizer 97 | 5 |
| Polytergent B-150 | 0.25 |
| Heptane | 5 |
| H$_2$O | 70.75 |
|  | 100.00 |
| Physical Properties | |
| Brookfield viscosity: 1500 (#3 spindle, 30 rpm, 26° C.) | |
| % solids: 8.8% moisture balance, 15 min. | |

As a result of a successful field test with Example 3 on tread bottoms, the adhesive was characterized by the tire manufacturer as five to six times better in green tack compared to a hydrocarbon based cement. Even after standing for seven days, a tread coated with the cement could be used to build a tire without the need for wiping the surface of tire carcasses with a solvent for rejuvenation of the tread cement.

Some tires were also built for experiment using the adhesive of Composition 4, tested for endurance. The adhesive was used both as an undertread and a tread end cement. The tires set a new record in mileage before failure under the endurance test. A further field test revealed superior green tack and treads coated therewith still had sufficient green tack for tire building after standing for nine days.

It was also determined on an experimental basis there was no noticeable difference between application of the two formulations (Composition 3, Composition 4) to tread surfaces. Both were easily brushed on and the emulsions easily broke, allowing the water to be brushed off or blown off with air. The treads were allowed to stand (age) for two hours before building the tires. The green tack of Example 3 was deemed equal to the standard hydrocarbon cement. The green tack of Composition 4 was found to be far superior to the standard, so much so that the tire builder had difficulty adjusting the tread on the carcass (usually necessary), further evidencing efficacy of this formulation as an end splice cement.

From the standpoint of cured strength, tires built with the adhesive of Composition 4 exceeded the endurance standards both of the manufacturer and the Department of Transportation.

As the solvents evaporate, the increasing proportion of water renders the emulsion more and more unstable, heat and/or pressure will easily break the unstable emulsion, and the active ingredients are released to bond the two surfaces.

Laboratory tests indicate that the performance properties of Composition 4 were comparable to those of Composition 3.

In general, water-based tread cements can be applied to green treads by brushing, spraying, or roller coating. Suitable techniques of the cement coating for tire building range from about 2 to 4 mils. When the coating is applied to the green tread at thicknesses which are too thin, the green tack of the aged tread may be insufficient for tire building. When the coating is applied too thick, the cement may not dry within the scorch time.

Example 5

Listed below are additional compositions of the invention designated as Compositions 5 and 6. These compositions illustrate that the ratio of tackifier to rubber may be varied yet, at the same time, still provide good adhesive compositions:

|  | Composition 5 Wt. % | Composition 6 Wt. % |
| --- | --- | --- |
| Natural rubber-based Rubber Compound | 1 | 1 |
| Akrochem P-90 | 1 | 6 |
| LOPS | 17 | 12 |
| Santicizer 97 | 5 | 5 |
| Polytergent B-150 | 0.25 | 0.25 |
| Heptane | 5 | 5 |
| $H_2O$ | 70.75 | 70.75 |
|  | 100.00 | 100.00 |

The performance properties by laboratory tests of the Compositions 5 and 6 were similar to those of the Composition 3.

Example 6

Listed below are Compositions 7 and 8. These compositions show that different emulsifiers may be used to provide compositions of the invention. In the following formula, Triton X-15 is octyl phenol reacted with a few moles of ethylene oxide. It has an HLB of 3.6..

|  | Composition 7 Wt. % | Composition 8 Wt. % |
| --- | --- | --- |
| Natural rubber-based Rubber Compound | 1 | 1 |
| LOPS | 14 | 14 |
| Akrochem P-90 | 4 | 4 |
| Santicizer 97 | 5 | 5 |
| Surfactant |  |  |
| Triton X-114 | 0.25 |  |
| Triton X-15 |  | 0.25 |
| Heptane | 5 | 5 |
| $H_2O$ | 70.75 | 70.75 |
|  | 100.00 | 100.00 |

Both cured adhesion and green tack of the Compositions 7 and 8 were comparable to those of Example 3 by laboratory tests.

Example 7

An example of a good water-based adhesive is set forth below as Composition 9:

| Composition 9 | Wt. % |
| --- | --- |
| Natural rubber-based Rubber Compound | 1.36 |
| Akrochem P-90 | 8.15 |
| LOPS | 4.08 |
| Toluene | 15.41 |
| Polytergent B-150 | 0.25 |

| Composition 9 | Wt. % |
| --- | --- |
| $H_2O$ | 70.75 |
|  | 100.00 |

Brookfield viscosity (#3 spindle, 30 rpm, 22° C.)—1560 cps.

Having thus described our invention, we claim:

1. A tire tread cement comprising a water-in-oil emulsion having an oil continuous phase containing:

| Ingredients | Weight % |
| --- | --- |
| (a) Vulcanizable rubber compound | 0.5–15.0 |
| (b) Organic hydrocarbon liquid solvent having a B.P. greater than 230° F. | 1.0–50.0 |
| (c) Water | 20.0–80.0 |
| (d) Surfactant having an HLB between about 3.6–18 | 0.1–10.0 |
| (e) Tackifier | 0.0–10.0 |
| (f) Plasticizer | 0.0–10.0 | and wherein the hydrocarbon liquid solvent has dissolved therein the vulcanizable rubber compound forming the oil continuous phase.

2. The tire tread cement of claim 1 wherein the vulcanizable rubber compound is a tread stock rubber compound.

3. The tire tread cement of claim 1 wherein the surfactant has an HLB within the range of 8.0–14.0.

4. The tire tread cement of claim 1 wherein the tackifier is in the range 1.0–5.0 weight % and the plasticizer is in the range 0.1–5.0 weight %.

5. A tire tread cement comprising a water-in-oil emulsion having an oil continuous phase containing:

| Ingredients | Weight % |
| --- | --- |
| (a) Vulcanizable rubber compound | 0.5–15.0 |
| (b) Organic hydrocarbon liquid solvent having a B.P. greater than 230° F. | 1.0–50.0 |
| (c) Hydrocarbon liquid solvent with B.P. less than 111° C. | 1.0–50.0 |
| (d) Water | 20.0–80.0 |
| (e) Surfactant having an HLB between about 3.6–18 | 0.1–10.0 |
| (f) Tackifier | 0.0–10.0 |
| (g) Plasticizer | 0.0–10.0 | wherein the ratio of b:c is in the range 5:1 to 1:5 and wherein the ratio of f:a is within the range of 0:1 to 8:1.

6. The tire tread cement of claim 5 wherein the surfactant has an HLB between 8–14.

7. The tire tread cement of claim 5 wherein the tackifier is within 1.0–5.0 weight percent and the plasticizer is within 1.0–5.0 weight percent.

8. The tire tread cement of claim 5 wherein the water is within the range of 40.0–80.0 weight percent.

9. A tire tread cement comprising a water-in-oil emulsion having a oil continuous phase containing:

| Ingredients | Weight % |
| --- | --- |
| (a) Vulcanizable rubber compound | 0.5–15.0 |
| (b) Organic hydrocarbon liquid solvent having a B.P. greater than 230° F. | 5.0–40.0 |
| (c) Water | 40.0–80.0 |
| (d) Surfactant having an HLB between about 3.6–18 | 0.25–5.0 |

| Ingredients | Weight % |
|---|---|
| (e) Tackifier | 1.0–5.0 |
| (f) Plasticizer | 1.0–5.0 | wherein the continuous oil phase of the water-in-oil emulsion comprises a solution of a in b.

10. The tire tread cement of claim 9 wherein the surfactant has an HLB in the range 8–14.

11. A tire tread cement comprising a water-in-oil emulsion having an oil continuous phase containing:

| Ingredients | Weight % |
|---|---|
| (a) Vulcanizable rubber compound | 0.5–15.0 |
| (b) Organic hydrocarbon liquid solvent having a B.P. greater than 230° F. | 5.0–40.0 |
| (c) Hydrocarbon liquid solvent witn B.P. less than 111° C. | 5.0–40.0 |
| (d) Water | 40.0–80.0 |
| (e) Surfactant having an HLB between about 3.6–18 | 0.25–5.0 |
| (f) Tackifier | 1.0–5.0 |
| (g) Plasticizer | 1.0–5.0 | wherein the ratio of b:c ranges between 5:1 to 1:5.

12. The tire tread cement of claim 11 wherein the surfactant has an HLB within the range 8–14.

* * * * *